(12) United States Patent
Montalvo Martinez et al.

(10) Patent No.: US 9,422,179 B2
(45) Date of Patent: Aug. 23, 2016

(54) PROCESS TO ANAEROBIC DIGESTION OF WASTEWATER WITH HIGH CONCENTRATION OF AMMONIA NITROGEN OR PROTEIN, IN UPFLOW ANAEROBIC DIGESTER AND SLUDGE BLANKET, WITH IMMOBILIZATION OF MICROORGANISMS AND INHIBITION BY AMMONIUM CONTROLLED USING ZEOLITE-CLINOPTILOLITE, AND OPTIONAL PRODUCTION OF BIOFERTILIZER

(71) Applicant: Universidad de Santiago de Chile, Santiago (CL)

(72) Inventors: Silvio Jacinto Montalvo Martinez, Santiago (CL); Enrique Pablo Sanchez Hernandez, Havana (CU); Lorna Elena Guerrero Saldes Elena, Vina del Mar (CL)

(73) Assignee: UNIVERSIDAD DE SANTIAGO DE CHILE, Santiago (CL)

( * ) Notice: Subject to any disclaimer, the term of this patent is extended or adjusted under 35 U.S.C. 154(b) by 0 days.

(21) Appl. No.: 14/290,397

(22) Filed: May 29, 2014

(65) Prior Publication Data

US 2014/0353246 A1    Dec. 4, 2014

(30) Foreign Application Priority Data

May 30, 2013   (CL) .................................. 1529-2013

(51) Int. Cl.
*C02F 3/28* (2006.01)
*C02F 3/10* (2006.01)

(52) U.S. Cl.
CPC ............... *C02F 3/2846* (2013.01); *C02F 3/105* (2013.01); *C02F 3/2806* (2013.01); *Y02E 50/343* (2013.01); *Y02W 10/15* (2015.05); *Y02W 10/37* (2015.05)

(58) Field of Classification Search
CPC ...... C02F 3/2846; C02F 3/2806; C02F 3/105; Y02E 50/343; Y02W 10/37

USPC ......... 210/603, 615, 616, 617, 630, 903, 905, 210/631

See application file for complete search history.

(56) References Cited

U.S. PATENT DOCUMENTS

| | | | | | |
|---|---|---|---|---|---|
| 5,702,604 | A | * | 12/1997 | Yamasaki | B01D 53/18 210/151 |
| 2011/0068058 | A1 | * | 3/2011 | Sun | B01D 61/08 210/620 |

FOREIGN PATENT DOCUMENTS

| JP | 62-279898 A | * | 12/1987 |
|---|---|---|---|
| JP | 2004-358391 A | * | 12/2004 |

OTHER PUBLICATIONS

Mery C, Guerrero L, Alonso-Gutierrez J, Figueroa M, Lema JM, Montalvo S, Borja R. 2012. Evaluation of zeolite as microorganisem support medium in nitrifying batch reactors: influence of zeolite particle size. Journal of Environmental Science and Health. A 47, 420-427.

(Continued)

*Primary Examiner* — Fred Prince
(74) *Attorney, Agent, or Firm* — Bryan D. Zerhusen; Locke Lord LLP (57) ABSTRACT

Procedure using zeolite, clinoptilolite type in an upflow anaerobic reactor and sludge blanket (UASBs) in order to obtain granular active sludge, thereby improving the density of the sludge, and thereby, their settling properties, and increase of biomass within reactor by immobilizing microorganisms, to achieve an increase in the efficiency of the removal of organic material and the production of biogas (60-70% methane) in more than 20% over the same type reactor used so far without zeolite, enabling the use of such reactor for treating wastewater with a high concentration of proteins, amino acids and other nitrogen compounds and which prevents the accumulation of nitrogen, which is toxic to the process by allowing zeolite-clinoptilolite, the exchange with alkali and alkaline earth found in specific points of the crystal structure of clinoptilolite by ammonia nitrogen, and also preventing the development of filamentous bacteria, which are difficult to hold up within the reactor and reduces its efficiency.

6 Claims, 3 Drawing Sheets

(56) References Cited

OTHER PUBLICATIONS

Bernal MP, Lopez JM. 1993. Natural ziolites and sepiolites as ammonium and ammonia adsorbent materials. Bioresource Technology. 43, 27-33.

Borja R, Sanchez E, Weiland P, Travieso L. 1993. Effect of ionic exchanger addition on the anaerobic digestion of cow manure. Environmental Technology. 14, 891-896.

Du Q, Liu SJ, Cao ZH, Wang YQ. 2005. Ammonia removal from aqueous solution using natural Chinese clinoptilolite. Separation and Purification Technology. 44, 229-234.

Chang WS, Tran HT, Park DH, Zhang RH, Ahn DH. 2009. Ammonium nitrogen removal characteristics of zeolite media in a biological aerated filter (BAF) for the treatment of textile wastewater. Journal of Industrial Engineering. Chemistry. 15, 524-528.

Montalvo S, Diaz F, Guerrero L, Sanchez E, Borja R. 2005. Effect of particle size and doses of zeolite addition on anaerobic digestion processes of synthetic and piggery wastes. Process Biochemistry. 40, 1475-81.

Hedstrom A, Amofah LR. 2008. Adsorption and desorption of ammonium by clinoptilolite adsorbent in municipal wastewater treatment systems. Journal of Environmental Engineering and Science. 7, 53-61.

Milan Z, Sanchez E, Borja R, Weiland P, Cruz M, 2001. Synergistic effect of natural and modified zeolites on the methanogenesis of acetate and methanol. Biotechnology Letters, 23, 559-562.

Kotsopoulus RA, Karamanlis X, Dotas D, Martzopoulos GG. 2008. The impact of different natural zeolite concentrations on the methane production in thermophilicanaerobic digestion of pig waste. Biosystems Engineering. 99, 105-111.

Montalvo S, Guerrero L, Borja R, Travieso I, Sanchez E. Diaz F. 2006. Use of natural zeolite at different doses or dosage procedures in batch and continuous anaerobic digestion of synthetic and swine wastes. Resources, Conservation and Recycling. 47, 26-41.

Sanchez E, Milan Z, Borja R, Weiland P, Rodriquez X. 1995, Piggery waste treatment by anaerobic digestion and nutrient removal by ionic exchange. Resources, Conservation and Recycling. 15, 235-244.

Sarioglu, M. 2005. Removal of ammonium from municipal wastewater using natural Turkish (Dogantepe) zeolite. Separation and Purification Technology. 41, 1-11.

Wang Y, Lin F, Pang W. 2008. Ion exchange of ammonium in natural and synthesized zeolites. Journal of Hazardous Materials. 160, 371-375.

Wei YX, Li YF, Ye ZF. 2010. Enhancement of removal efficiency of ammonia nitrogen in sequencing batch reactor using natural zeolite. Environmental Earth Science. 60, 1407-13.

Montalvo S, Guerrero L, Borja R, Sanchez E, Milan Z, Cortes I, Angeles de la Rubia M. 2012. Application of natural zeolites in anaerobic digestion process: a review. Applied Clay Science. 58, 125-133.

Hulshoff et al, 2004.

Bernal MP, Lopez-Real JM, Scott KM. 1993. Application of natual ziolites for the reduction of ammonia emissions during the composting of organic wastes in a laboratory composting simulator. Biosource Technology. 43, 35-39.

Borja R, Sanchez E, Weiland P, Travieso L, Martin A. 1993. Effect of natural ziolite support on the kinetics of cow manure anaerobic digestion. Biomass and bioenergy. 5, 395-400.

Borja R, Sanchez E, Weiland P, Travieso L, Martin A. 1994. Kinetics of anaerobic digestion of cow manure with biomass inmobilized on zeolite. Biochemical Engineering Journal. 54, B9-B14.

Borja R, Zanchez E, Duran MM. 1996. Effect of the clay mineral ziolite on ammonia inhibition of anaerobic thermophilic reactors treating cattle manure. 1996. Journal of Environmental Science and Health. A 31(2), 479-500.

Milan Z, Sanchez E, Weiland P, de Las Pozas C, Borja R., Mayan R., Rovirosa N. 1997. Ammonia removal from anaerobically treated piggery manure by ion exchange in columns packed with homoionic zeolite. The Chemical Engineering Journal. 66, 65-71.

Milan Z, Sanchez E, Borja R, Ilangovan K, Pellon A, Rovirosa N, Weiland P, Escobedo R.1999. Deep bed filtration of anaerobic cattle manure effluents with natural ziolite. Journal of Environmental Science and Health. B34(2), 305-332.

Fernandez N. Fernandez-Polanco F, Montalvo SJ, Toledano D. 2001. Use of activated carbon and natural ziolite as support materials, in an anaerobic fluidized bed reactor, for vinasse treatment. Water Science and Technology 44, 1-6.

Milan Z, Sanchez E, Weiland P, Borja R, Martin A, Ilangoban K. 2001. Influence of different natural zeolite concentrations on the anaerobic digestion of piggery waste. Biosource Technology. 80, 37-43.

Milan Z, Villa P, Sanchez E, Montalvo S, Borja R, Ilangovan K. 2003. Effect of natural and modified zeolite on anaerobic digestion of piggery waste. Water Science and Technology. 48, 263-9.

Tada C, Yang Y, Hanaoka T, Sonoda A, Ooi K, Sawayama S. 2005. Effect of natural zeolite on methane production from anaerobic digestion of ammonium rich organic sludge. Bioresource Technology. 96, 459-464.

Guo X. Zeng L, Li X, Par HS. 2008. Ammonium and potassium removal for anaerobically digested wastewater using natural clinoptilolita followed by membrance pretreatment. Journal of Hazard Materials. 151, 125-133.

Umana O, Nikolaeva S, Sanchez E, Borja F, Raposo R. 2008. Treatment of screened dairy manure by upflow anaerobic fixed bed reactors packed with waste tire rubber and a combination of waste tire rubber and zeolite: effect of the hydraulicretention time. Bioresource Technology. 99, 7412-7417.

Nikolaeva S, Sanchez E, Borja R, Raposo F, Colmenarejo MF, Montalvo S, Jimenez-Robriguez AM. 2009. Kinetics of anaerobic degradation of screened dairy manure by upflow fixed bed digesters: effect of natural zeolite addition. Journal of Environmental. Science and Health. Part A 44, 146-150.

Weiβ S, Tauber M, Somotsch W, Meinchke R, Muller H, Berg G, Guebitz GM,. 2010. Enhancement of biogas production by addition of hemicellulolytic bacteria immobilized on active zeolite. Water Research 44, 1970-1980.

Weiβ S, Zankel A, Lebuhn, M, Petrak S, Somitsch W, Guebitz GM. 2011. Investigation of microorganisms colonizing activated zeolites during anaerobic biogas production from grass silage. Bioresource Technology 102, 4353-4359.

He SB, Xue G, Kong HN. 2006. Zeolite powder addition to improve the performance of submerged gravitation-filtration membrane bioreactor. Journal of Environmental Science. 18, 242-247.

He SB, Xue G, Kong HN, Li X. 2007. Improving the performance of sequencing batch reactor (SBR) by the addition of zeolite powder. Journal of Hazard Materials. 142, 493-499.

Jiang, YF, Liu DH, Sun TX, Chem JM. 2010. Process characteristics of zeolite media biological aerated filter for treating aquaculture wastewater. Huanjing Kexue/Environmental Science. 31, 703-708.

* cited by examiner

PROCESS TO ANAEROBIC DIGESTION OF WASTEWATER WITH HIGH CONCENTRATION OF AMMONIA NITROGEN OR PROTEIN, IN UPFLOW ANAEROBIC DIGESTER AND SLUDGE BLANKET, WITH IMMOBILIZATION OF MICROORGANISMS AND INHIBITION BY AMMONIUM CONTROLLED USING ZEOLITE-CLINOPTILOLITE, AND OPTIONAL PRODUCTION OF BIOFERTILIZER

CROSS-REFERENCE TO RELATED APPLICATIONS

The present invention claims priority to Chilean Application No. CL 1529-2013 filed on May 30, 2013, which is incorporated herein by reference.

TECHNICAL FIELD

The present invention relates to a process of anaerobic digestion in an upflow anaerobic digester and sludge blanket (UASB) by adding the active zeolite-clinoptilolite sludge responsible for anaerobic degradation of organic matter. The zeolite is added in a proportion of 15-23% of the total volume of the slurry in an amount sufficient to achieve a better retention of the sludge in the reactor and the removal of the required amount of nitrogen in order to prevent inhibition process due to this compound. The zeolite used must be a clinoptilolite type since it has a high capacity to remove ammonia nitrogen due to its properties as ion exchanger.

BACKGROUND ART

The upflow anaerobic digester and mantle has a wide application for the treatment of wastewater from different features, such as domestic or served sewage, wastewater from distilleries, wastewater from the sugar industry, canning industry, benefit of coffee, dairy products, soft drinks, production of pharmaceuticals, landfill leachate, starch production, yeast production, brewery, and paper production. In these cases, the removal efficiencies of organic matter have been achieved relatively high, with values between 70-85%. However, the process has failed when it has been applied to wastewater containing a high concentration of proteins or ammonium, such as those generated in the fish processing industries, animal husbandry facilities, processors of meat products, slaughter of animals, production of nitrogen fertilizers, among others, as these hinder the formation of granules in the filamentous structures developed (Sanchez et al, 1995; Hulshoff et al, 2004, Tada et al, 2005, Montalvo et al, 2012). This results in poor sludge settling properties and a low removal efficiency. On the other hand, a high concentration of organic nitrogen and ammonium causes inhibition of anaerobic digestion, which directly affects low removal efficiency of organic matter and low methane production.

There are several reports indicating that when the concentration of ammonia nitrogen exceeds 1000 mg/l, the formation of granular sludge is seriously affected. Inhibition process also occurs when the wastewater has a high protein concentration and chemical oxygen demand (COD) ratio: Nitrogen (N) is below 30 to 1 (Sanchez et al, 1995; Hulshoff et al., 2004, Tada et al, 2005; Montalvo et al, 2012).

Zeolite clinoptilolite has been employed in controlling the formation of ammonia nitrogen in wastewater with a high concentration of organic nitrogen (Bernal M. P., López-Real J. M. 1993. Natural zeolites and sepiolites as ammonium and ammonia adsorbent materials. Bioresource Technology. 43, 27-33; Bernal M. P., López-Real J. M., Scott K. M. 1993. Application of natural zeolites for the reduction of ammonia emissions during the composting of organic wastes in a laboratory composting simulator Bioresource Technology. 43, 35-39; Borja R., Sánchez E., Weiland P., Travieso L. 1993. Effect of ionic exchanger addition on the anaerobic digestion of cow manure. Environmental Technology. 14, 891-896; Borja R., Sánchez E., Weiland P., Travieso L., Martín A. 1993. Effect of natural zeolite support on the kinetics of cow manure anaerobic digestión. Biomass and Bioenergy. 5, 395-400; Borja R., Sánchez E., Weiland P., Travieso L., Martín A. 1994. Kinetics of anaerobic digestion of cow manure with biomass immobilized on zeolite. Biochemical Engineering Journal. 54, B9-B14; Sánchez E., Milán Z., Borja R., Weiland P., Rodriguez X. 1995. Piggery waste treatment by anaerobic digestion and nutrient removal by ionic Exchange. Resources, Conservation and Recycling. 15, 235-244; Borja R., Sánchez E., Durán M. M. 1996. Effect of the clay mineral zeolite on ammonia inhibition of anaerobic thermophilic reactors treating cattle manure. 1996. Journal of Environmental Science and Health. A 31(2), 479-500; Milán Z., Sánchez E., Weiland P., de Las Pozas C., Borja R., Mayarí R., Rovirosa N. 1997. Ammonia removal from anaerobically treated piggery manure by ion exchange in columns packed with homoionic zeolite. The chemical Engineering Journal. 66, 65-71; Milán Z., Sánchez E., Borja R., Ilangovan K., Pellon A., Rovirosa N., Weiland P., Escobedo R. 1999. Deep bed filtration of anaerobic cattle manure effluents with natural zeolite. Journal of Environmental Science and Health. B34 (2), 305-332; Fernández N., Fernández-Polanco F, Montalvo S J, Toledano D. 2001. Use of activated carbon and natural zeolite as support materials, in an anaerobic fluidized bed reactor, for vinasse treatment. Water Science and Technology 44, 1-6; Milan Z., Sánchez E., Borja R., Weiland P., Cruz M. 2001. Synergistic effect of natural and modified zeolites on the methanogenesis of acetate and methanol. Biotechnology Letters, 23, 559-562; Milán Z., Sánchez E., Weiland P., Borja R., Martín A., Ilangoban K. 2001. Influence of different natural zeolite concentrations on the anaerobic digestion of piggery waste. Bioresource Technology. 80, 37-43; Milán Z, Villa P, Sánchez E, Montalvo S, Borja R, Ilangovan K. 2003. Effect of natural and modified zeolite on anaerobic digestion of piggery waste. Water Science and Technology. 48, 263-9; Du Q., Liu S. J., Cao Z. H., Wang Y. Q. 2005. Ammonia removal from aqueous solution using natural Chinese clinoptilolite. Separation and Purification Technology. 44, 229-234; Montalvo S, Díaz F, Guerrero L, Sánchez E, Borja R. 2005. Effect of particle size and doses of zeolite addition on anaerobic digestion processes of synthetic and piggery wastes. Process Biochemistry. 40, 1475-81; Sarioglu, M. 2005. Removal of ammonium from municipal wastewater using natural Turkish (Dogantepe) zeolite. Separation and Purification Technology. 41, 1-11; Tada C., Yang Y., Hanaoka T., Sonoda A., Ooi K., Sawayama S. 2005. Effect of natural zeolite on methane production from anaerobic digestion of ammonium rich organic sludge. Biosurce Technology. 96, 459-464; Montalvo S., Guerrero L., Borja R., Travieso l., Sánchez E., Díaz F. 2006. Use of natural zeolite at different doses and dosage procedures in batch and continuous anaerobic digestion of synthetic and swine wastes. Resources, Conservation and Recycling. 47, 26-41; Guo X., Zeng L., Li X., Par H. S. 2008. Ammonium and potassium removal for anaerobically digested wastewater using natural clinoptilolita followed by membrane pretreatment. Journal of Hazard Materials. 151, 125-133; Hedstrom A., Amofah L. R. 2008. Adsorption and desorption of ammonium by clinoptilolite adsorbent in municipal wastewater treatment systems. Journal of Environmental Engineering. Science. 7, 53-61; Umaña, O., Nikolaeva, S., Sánchez, E., Borja, R., Raposo, F. 2008. Treatment of screened dairy manure by upflow anaerobic fixed bed reactors packed with waste tyre rubber and a combination of waste tyre rubber and zeolite: effect of the hydraulic retention time. Bioresource Technology 99, 7412-7417; Wang Y., Lin F., Pang W., 2008. Ion exchange of ammonium in natural and synthesized zeolites. Journal of Hazardous Materials 160, 371-375; Chang W. S., Tran H. T., Park D. H., Zhang R. H., Ahn D. H. 2009. Ammonium nitrogen removal characteristics of zeolite media in a biological aerated filter (BAF) for the treatment of textile wastewater. Journal of Industrial Engineering. Chemistry. 15, 524-528; Nikolaeva, S., Sánchez, E., Borja, R., Raposo, F., Colmenarejo, M. F., Montalvo, S., Jiménez-Rodríguez, A. M. 2009. Kinetics of anaerobic degradation of screened dairy manure by upflow fixed bed digesters: effect of natural zeolite addition. Journal of Environmental. Science and Health. Part A 44, 146-150; Wei Y. X., Li Y. F., Ye Z. F. 2010. Enhancement of removal efficiency of ammonia nitrogen in sequencing batch reactor using natural zeolite. Environmental Earth Science. 60, 1407-1413; Montalvo S., Guerrero L., Borja R., Sánchez E., Milán Z., Cortés I., Angeles de la Rubia M. 2012. Application of natural zeolites in anaerobic digestion process: A Review. 2012. Apply Clay Science. 58, 125-133). The addition of zeolite-clinoptilolite, in the anaerobic digestion of residual bovine prevented the inhibitory effect of the presence of ammonia and facilitated immobilization of the microorganisms (Borja R., Sánchez E., Weiland P., Travieso L. 1993. Effect of ionic exchanger addition on the anaerobic digestion of cow manure. Environmental Technology. 14, 891-896). The kinetics of anaerobic digestion was studied residual veal is completely mixed batch digesters with zeolite-clinoptilolite support and control without zeolite support, showing that the constant rate was almost twice that used in the zeolite-clinoptilolite digester support than the reaction constant control (Borja R., Sánchez E., Weiland P., Travieso L. 1993. Effect of ionic exchanger addition on the anaerobic digestion of cow manure Environmental Technology 14, 891-896). The same study was performed in continuous operating digesters and the same behavior was observed. Furthermore ammonia nitrogen concentration was significantly lower when zeolite-clinoptilolite was added (Borja R., Sánchez E., Weiland P., Travieso L., Martín A. 1994. Kinetics of anaerobic digestion of cow manure with biomass immobilized on zeolite. Biochemical Engineering Journal. 54, B9-B14). A similar study was conducted with swine wastewater and the results were very similar to those obtained with bovine residual (Sánchez E., Milán Z., Borja R., Weiland P., Rodriguez X. 1995. Piggery waste treatment by anaerobic digestion and nutrient removal by ionic Exchange. Resources, Conservation and Recycling. 15, 235-244). Removal capacity of the zeolite ammonia nitrogen in porcine and cattle wastewater after treatment by anaerobic digestion was studied, showing the removal of ammonia nitrogen of about 90% (Milán Z., Sánchez E., Weiland P., de Las Pozas C., Borja R., Mayarí R., Rovirosa N. 1997. Ammonia removal from anaerobically treated piggery manure by ion exchange in columns packed with homoionic zeolite. The chemical Engineering Journal. 66, 65-71; Milán Z., Sánchez E., Borja R., Ilangoban K., Pellon A., Rovirosa N., Weiland P., Escobedo R. 1999. Deep bed filtration of anaerobic cattle manure effluents with natural zeolite. Journal of Environmental Science and Health. B34 (2), 305-332; Milan Z., Sánchez E., Borja R., Weiland P., Cruz M. 2001. Synergistic effect of natural and modified zeolites on the methanogenesis of acetate and methanol. Biotechnology Letters, 23, 559-562; Milán Z., Sánchez E., Weiland P., Borja R., Martín A., Ilangoban K. 2001. Influence of different natural zeolite concentrations on the anaerobic digestion of piggery waste. Bioresource Technology. 80, 37-43; Milán Z, Villa P, Sánchez E, Montalvo S, Borja R, Ilangovan K. 2003. Effect of natural and modified zeolite on anaerobic digestion of piggery waste. Water Science and Technology 48, 263-9). It has been shown that the addition of natural zeolite reduces the concentration of nitrogen and contributes to the production of methane by anaerobic digestion of various waste even with high concentrations of nitrogen (Milan Z., Sánchez E., Borja R., Weiland P., Cruz M. 2001. Synergistic effect of natural and modified zeolites on the methanogenesis of acetate and methanol. Biotechnology Letters, 23, 559-562; Milán Z, Villa P, Sánchez E, Montalvo S, Borja R, Ilangovan K. 2003. Effect of natural and modified zeolite on anaerobic digestion of piggery waste. Water Science and Technology. 48, 263-9; Tada C., Yang Y., Hanaoka T., Sonoda A., Ooi K., Sawayama S. 2005. Effect of natural zeolite on methane production from anaerobic digestion of ammonium rich organic sludge. Bioresurce Technology. 96, 459-464; Kotsopoulos, T. A., Karamanlis, X., Dotas, D., Martzopoulos, G. G. 2008. The impact of different natural zeolite concentrations on the methane production in thermophilic anaerobic digestion of pig waste. Biosystems Engineering 99, 105-111; Weiβ S., Tauber M., Somitsch W., Meincke R., Müller H., Berg G., Guebitz G. M., 2010. Enhancement of biogas production by addition of hemicellulolytic bacteria immobilized on active zeolite. Water Research 44, 1970-1980; Weiβ, S., Zankel, A., Lebuhn, M., Petrak, S., Somitsch, W., Guebitz, G. M. 2011. Investigation of microorganisms colonizing activated zeolites during anaerobic biogás production from grass silage. Bioresource Technology 102, 4353-4359; Montalvo S., Guerrero L., Borja R., Sánchez E., Milán Z., Cortés I., Angeles de la Rubia M. 2012. Application of natural zeolites in anaerobic digestion process: A Review. 2012. Apply Clay Science. 58, 125-133).

Mery C., Guerrero L., Alonso-Gutierrez J., Figueroa M., Lema J. M., Montalvo S., Borja R. 2012. Evaluation of zeolite as microorganism support medium in nitrifying batch reactors: Influence of zeolite particle size. Journal of Environmental Science and Health. A 47, 420-427. Research. 62, 71-76, compared the ion exchange capacity of the zeolite and different particle sizes and showed that the best size range is 0.5 to 1 mm, in these cases reaching removal of ammoniacal nitrogen greater than 64% for particle sizes greater. Montalvo S., Guerrero L., Borja R., Sánchez E., Milán Z., Cortés I., Angeles de la Rubia M. 2012. Application of natural zeolites in anaerobic digestion process: A Review. 2012. Apply Clay Science. 58, 125-133, they conducted a literature review regarding employment of the zeolite in preventing inhibition by ammonium during anaerobic digestion of various types of wastewater demonstrating it in this article, the effective properties of the zeolite in controlling the inhibition and their ability to immobilize anaerobic microorganisms.

The effect of the addition of zeolite for the immobilization of microorganisms has been studied with satisfactory results in both aerobic and anaerobic processes (Borja y col., 2003; Fernández N., Fernández-Polanco F, Montalvo S J, Toledano D. 2001. Use of activated carbon and natural zeolite as support materials, in an anaerobic fluidized bed reactor, for vinasse treatment. Water Science and Technology 44, 1-6; He S. B., Xue, G., Kong H. N. 2006. Zeolite powder addition to improve the performance of submerged gravitation-filtration membrane bioreactor. Journal of Environmental. Science. 18, 242-247; He S. B., Xue G., Kong H. N., Li X. 2007. Improving the performance of sequencing batch reactor (SBR) by the addition of zeolite powder. Journal of Hazard Materials. 142, 493-499; Umaña, O., Nikolaeva, S., Sánchez, E., Borja, R., Raposo, F. 2008. Treatment of screened dairy manure by upflow anaerobic fixed bed reactors packed with waste tyre rubber and a combination of waste tyre rubber and zeolite: effect of the hydraulic retention time. Bioresource Technology 99, 7412-7417; Nikolaeva, S., Sánchez, E., Borja, R., Raposo, F., Colmenarejo, M. F., Montalvo, S., Jiménez-Rodríguez, A. M. 2009. Kinetics of anaerobic degradation of screened dairy manure by upflow fixed bed digesters: effect of natural zeolite addition. Journal of Environmental. Science and Health. Part A 44, 146-150; Jiang Y. F., Liu D. H., Sun T. X., Chen J. M. 2010. Process characteristics of zeolite media biological aerated filter for treating aqua culture wastewater. Huanjing Kexue/Environmental Science. 31, 703-708; Weiβ S., Tauber M., Somitsch W., Meincke R., Müller H., Berg G., Guebitz G. M., 2010. Enhancement of biogas production by addition of hemicellulolytic bacteria immobilized on active zeolite. Water Research 44, 1970-1980; Weiβ, S., Zankel, A., Lebuhn, M., Petrak, S., Somitsch, W., Guebitz, G. M. 2011. Investigation of microorganisms colonizing activated zeolites during anaerobic biogás production from grass silage. Bioresource Technology 102, 4353-4359; Mery y col., 2011; Montalvo S., Guerrero L., Borja R., Sánchez E., Milán Z., Cortés I., Angeles de la Rubia M. 2012. Application of natural zeolites in anaerobic digestion process: A Review. 2012. Apply Clay Science. 58, 125-133).

The aforementioned literature review reveals that there are no related articles of the use of clinoptilolite type zeolite in upflow anaerobic digester and mantle of commonly known places such as UASB articles, nor any patent related to a method such as the present invention.

SUMMARY

The present invention relates to a process of anaerobic digestion in an upflow anaerobic digester and sludge blanket (UASB) by adding the granular zeolite-clinoptilolite activated sludge responsible for anaerobic degradation of organic matter. The zeolite is added in a proportion of 15-23% of the total volume of the slurry in an amount sufficient to achieve a better retention of the sludge in the reactor and the removal of the required amount of nitrogen in order to prevent inhibition amount process due to this compound. The zeolite used has to be of the clinoptilolite type which has a high capacity to remove ammonia nitrogen due to its properties as ion exchanger.

In other reactors in which zeolites have been used (anaerobic filters and fluidized filters), have not been intended to treat wastewater with high levels of nitrogen, nor obtaining a residue with characteristics of biofertilizer much less obtain better granulation of sludge within the reactors, with the granulation being the distinctiveness of UASB reactors.

Moreover, the objective of the patent is to solve the dilemma that the UASB reactor cannot be used in wastewater where there is a high concentration of proteins and/or ammonia nitrogen since the formation of pellets is not achieved and the washing of the microorganisms is performed with a consequent reduction in efficiency.

The UASB reactor, operates at lower retention time to any other type of reactor applied into wastewater so it is not possible or practical to compare the results of a UASB reactor with others.

DETAILED DESCRIPTION

The present invention relates to a process for the anaerobic digestion in a upflow anaerobic digester and sludge blanket (UASB) by adding the granular zeolite-clinoptilolite activated sludge responsible for anaerobic degradation of organic matter. The zeolite is added in a proportion of 15-23% of the total volume of the slurry in an amount sufficient to achieve a better retention of the sludge in the reactor and the removal of the required amount of nitrogen in order to prevent inhibition amount process due to this compound. The zeolite used has to be ofn the clinoptilolite type which has a high capacity to remove ammonia nitrogen due to its properties as ion exchanger.

Zeolite-clinoptilolite particle size of 0.5-2 mm is used.

Figure 1:
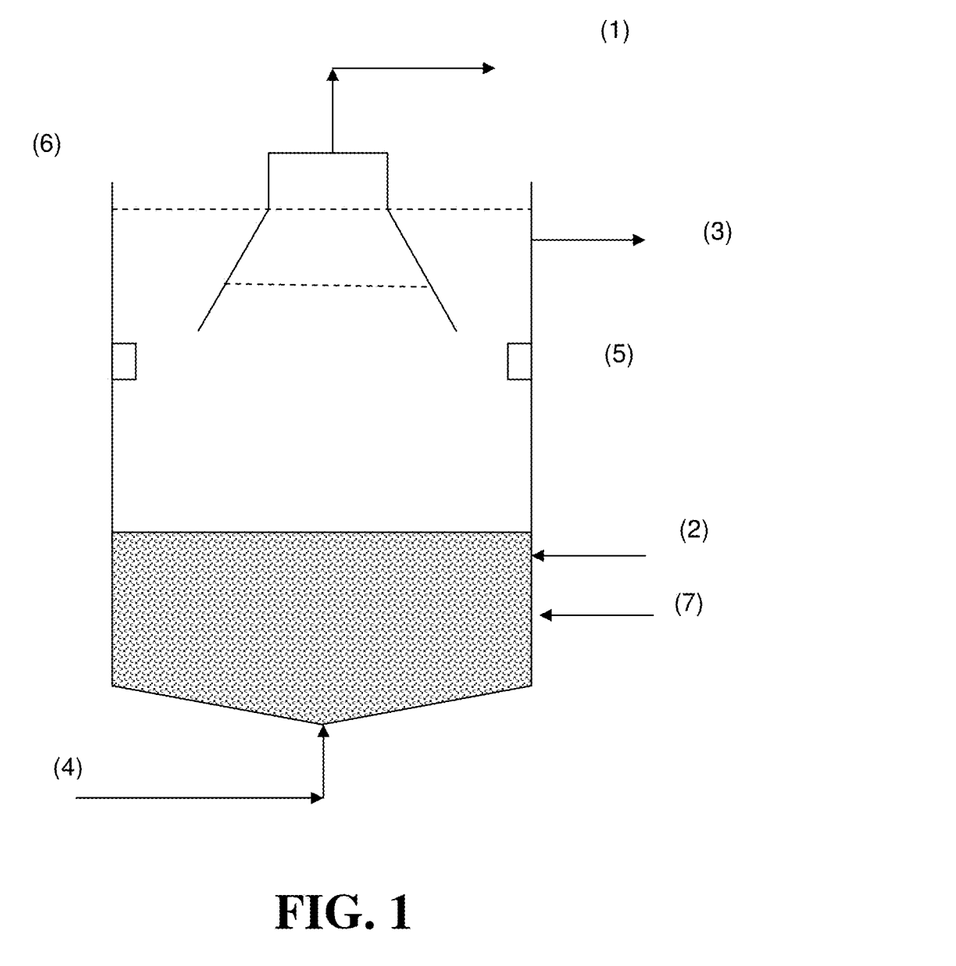
FIG. 1 shows a diagram of upflow anaerobic digester and sludge blanket, where (1) is biogas (2) is zeolite, (3) is the effluent, (4) is affluent, (5) is biogas deflectors (6) is settler separator biogas and (7) is digested sludge.

The concentration of zeolite-clinoptilolite in the reactor is maintained at a constant ratio by adding the required amount of material from the bottom of the digester as illustrated in FIG. 1.

The addition of zeolite occurs where a sustained decrease in the removal efficiency of nitrogen and the production of biogas is appreciated.

The removal efficiency of nitrogen varies between 50-80% for wastewater with a high concentration of ammonia nitrogen as evident from Table 1 below:

TABLE 1

| Process* | DQO, mg/l (affluent) | DQO, mg/l (affluent) | Ammonium, mg/l (affluent) | Ammonium, mg/l (affluent) | Biogás, l/day (60-70% CH$_4$) |
|---|---|---|---|---|---|
| Without zeolite | 5000 | 2500-2750 | 1500** | 1000-1150 | 110-133 |
| With zeolite | 5000 | 1250-1500 | 1500 | 300-750 | 137-195 |

*UASB Reactor; synthetic residual liquid; residual flow (affluent): 100 l/day; climb rate: 0.5-2 m/hour.
**Considered inhibitory concentration for the anaerobic process The addition of natural zeolite in the ratio described above causes an increase in the removal efficiency of organic matter and biogas production by 20-30% compared to a UASB digester that does not add clinoptilolite type zeolites as illustrated in tables 1 and 2.

TABLE 2

| Process* | DQO, mg/l (affluent) | DQO, mg/l (affluent) | Ammonium, mg/l (affluent) | Ammonium, mg/l (affluent) | Biogás, l/day (60-70% CH$_4$) |
|---|---|---|---|---|---|
| Without zeolite | 5000 | 1250-1500 | 100 | 20 | 136-180 |
| With zeolite | 5000 | 750-1000 | 100 | ND** | 195-225 |

*UASB Reactor; synthetic residual liquid; residual flow (affluent): 100 l/day; climb rate: 0.5-2 m/hour.
**Below detection limits.

The hydraulic retention time in the digester UASB addition of zeolite, is reduced by 20-30% compared to a UASB digester to which zeolite is added the as shown in Table 3.

TABLE 3

| parameter * | TRH**, 2 days Without zeolites | TRH, 1.6 days With zeolites | TRH, 1.4 days Without zeolites | With zeolites | Without zeolites | With zeolites |
|---|---|---|---|---|---|---|
| DQO, mg/l (affluent) | 20000 | 20000 | 20000 | 20000 | 20000 | 20000 |
| DQO, mg/l (effluent) | 7400-8000 | 5400-6000 | 9400-10400 | 7200-7800 | 9600-10600 | 7300-8000 |

* UASB Reactor; runoff from pig breeding facilities; residual flow (affluent): 100 l/day; climb rate: 0.5-2 m/hour.
**TRH: Hydraulic retention time The advantages of using zeolite-clinoptilolite as additive in anaerobic digesters UASB regarding UASB digesters which the zeolite is added will lie in the following:

An increased retention of active bacteria in the digester is obtained by increasing the sludge age and resulting in better adaptation of microorganisms, see Table 4.

TABLE 4

| Process[1] | SVS[2], mg/l (sludge blanket[3]) | Gránulo[3], mm | TRS[4], days | Fósforo, mg/l (sludge)[5] | Amonio, mg/l (sludge)[5] | Biogás, l/dia (60-70% $CH_4$) |
|---|---|---|---|---|---|---|
| Without zeolite | 20000 | 0.5 | 30 | 360-390 | 2850-3000 | 539-646 |
| With zeolite[6] | 45000 | 2.5 | 100 | 660-750 | 3000-5100 | 753-862 |

Figure 2:
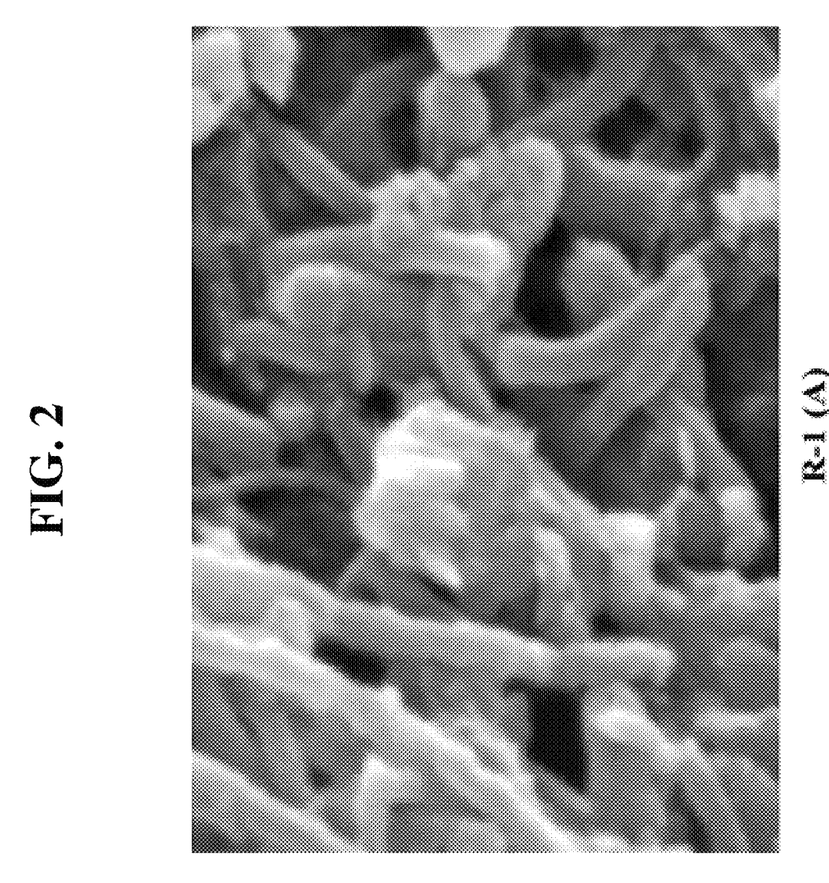
FIGS. 2 and 3 show electron microscopy where a large number of microorganisms are observed inside and on the surface of zeolite particles of different ways highlighting the coccus shaped morphology in bunches or clusters.
Figure 3:
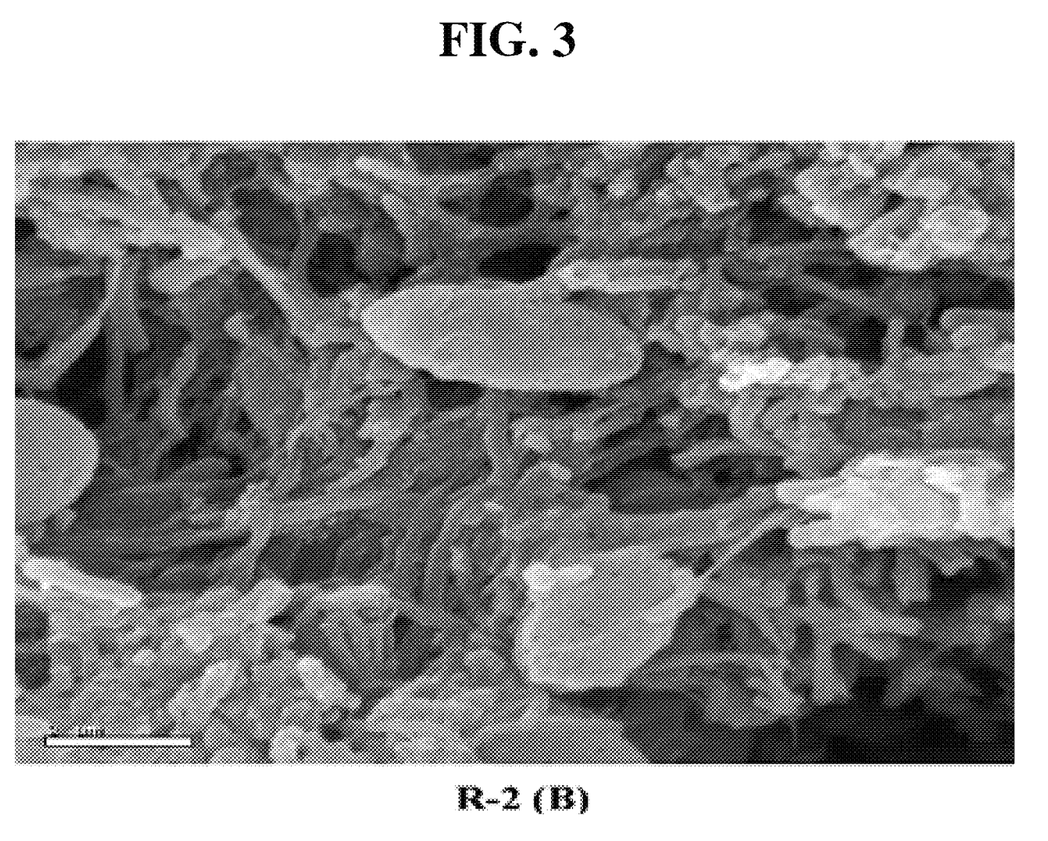

[1]UASB Reactor; runoff from pig breeding facilities; residual flow (affluent): 100 l/day; climb rate: 0.5-2 m/hour; COD influent 20 g/l; influent ammonia nitrogen 1500 mg/l; effluent total phosphorus: 300 mg/l.
[2]SVS: volatile suspended solids (measurement of biomass)
[3]Granule size in the UASB reactor
[4]Solids retention time or sludge age
[5]The presence of phosphorus and nitrogen (nutrients) in the sludge and organic material stabilized zeolite in particular for the characteristic of slow release of these characteristics gives biofertilizer and soil conditioners. This sludge has a 95-98% moisture so drying when nutrient concentration is much higher.
[6]Observaciones performed with electron microscopy allowed to observe many microorganisms inside and on the surface of particles of different forms of zeolites highlighting the coconut type morphology in clusters or sarcinas, similar to Methanosarcinas sarcinas, see FIGS. 2 and 3.

The increase in sludge age results in an increase of the removal efficiency of organic matter and biogas production.

A reduction of hydraulic retention time so the required volume of the digester and a saving in the cost of investment with respect to a UASB digester without addition of zeolite is reduced is achieved.

A high removal of nitrogen whereupon the potential inhibition of the process by reducing accumulation of ammonia is obtained, which cannot be achieved without adding a zeolite digester, see tables 1 and 4.

The addition of zeolite UASB digester expands its potential use in wastewater with a high concentration of nitrogen and/or protein.

The excess sludge generated in the process has a high concentration of nutrients and results in a slow release of fertilizer nutrients, see Table 4.

Once designed and constructed UASB digester for wastewater treatment with a high concentration of nitrogen or protein then the inoculum is added thereto in a ratio determined by the specific characteristics of the wastewater. In this inoculum, between 15 and 23% volume of zeolite is added in respect to the total volume of the sludge, clinoptilolite type zeolite with an average particle size between 0.5 and 2 mm. To the resulting obtained slurry an increasing amounts volumes of wastewater is added to be treated until it reaches the final operating conditions. Once established the stable operating condition determining digester operation removal of organic matter, the removal of nitrogen and this concentration is monitored in the digester. Besides biogas production and methane concentration thereof is monitored. An increase of nitrogen concentration in the digester effluent UASB decreased this removal efficiency, a decrease in the efficiency of removal of organic material and a decrease in biogas production determines a new addition of zeolite same as in the granular active sludge accumulation as shown in FIG. 1.

The volume of sludge in the digester has to be kept constant and in a proportion of 20% relative to the total volume of the digester.

The excess sludge produced is extracted from the bottom of the digester and is subjected to dehydration by using sunlight or other procedure to obtain a material with a concentration of 20-30% moisture. This material is a slow release of fertilizer nutrients, very useful in agriculture.

The zeolite addition to the anaerobic digestion UASB determines an increase of the efficiency of 20-30% of the biogas production by 20-30%, with respect to a UASB digester without addition of zeolite, and a reduction of the concentration ammonia nitrogen of 50-80% which is not achieved in UASB digester without the addition of zeolite. At last reducing the volume of the digester in 20 to 30% is achieved with respect to a UASB digester without zeolite addition.

The addition of zeolite permits the application of UASB sewage digester with a high concentration of nitrogen or of proteins such as agricultural wastewater source and the food industry.

EXAMPLES

Wastewater generated in pig farming and wastewater from dairy farms: two examples corresponding to two different types of wastewater are developed.

Example 1

Adding zeolite-clinoptilolite to a UASB digester operating with wastewater from the pig farming. Previously studied at laboratory scale treatment of residual porcine through two digesters UASB. A digester was used as a control while the other one was added zeolite clinoptilolite (10% of actual volume).

Both digesters were constructed of acrylic plastic, having an effective volume of 10 liters and a total volume of 12 liters with the following dimensions: length and width 15 cm, total height 53 cm; the effective height was 44 cm.

Both digesters operated at similar hydraulic retention time of 1-5 days.

The Porcine residual employed had the characteristics as summarized in Table 5:

TABLE 5

Characteristics of residual porcine used in the experiments

| Parameter | Range | Number of samples |
|---|---|---|
| DQO | 8.0-40.1 g/l | 20 |
| SST | 1.5-5.9 g/l | 20 |
| N organic | 278-716 mg/l | 20 |
| N ammonia | 198-790 mg/l | 18 |
| phosphorus | 329-696 mg/l | 18 |
| alkalinity | 1155-2550 mg/l | 20 |
| Volatile Acids | 1257-5400 mg/l | 16 |
| pH | 5.9-6.9 | 20 |

Digesters were inoculated with 4 liters of well-digested sludge. Adding to the digester with zeolite, 1 Kg of zeolite-clinoptilolite particle size between 0.5-2 mm was added. After each retention time studied, the zeolite was replaced and employing the same acclimated sludge.

The experiment lasted 10 times the hydraulic retention time employed.

During the experiment the following parameters were measured: COD; SST; organic and ammonia nitrogen, phosphorus (orthophosphate), alkalinity, volatile fatty acids, pH; gas production and methane concentration.

Table 6 shows the results obtained at different hydraulic retention times studied.

TABLE 6

Results obtained in the experiment

| | TRH (days) | | | | | | | | | |
|---|---|---|---|---|---|---|---|---|---|---|
| | 1 | | 2 | | 3 | | 4 | | 5 | |
| Parámeter | Control | zeolite | Control | zeolite | Control | zeolite | Control | zeolite | Control | zeolite |
| E (% DQO) | 50 | 71 | 60 | 80 | 68 | 86 | 75 | 90 | 80 | 95 |
| E (% SST) | 54 | 73 | 63 | 84 | 71 | 91 | 79 | 93 | 83 | 96 |
| E (% N org) | 25 | 37 | 32 | 44 | 35 | 51 | 39 | 64 | 45 | 71 |
| N. amon. Efl. | 605 | 237 | 633 | 213 | 648 | 164 | 667 | 122 | 696 | 83 |
| phosphorusEfl. | 282 | 253 | 237 | 221 | 219 | 197 | 210 | 167 | 198 | 157 |
| Alc. Efl. | 2316 | 2511 | 2408 | 2594 | 2483 | 2650 | 2548 | 2690 | 2594 | 2742 |
| AGV Efl. | 1042 | 929 | 965 | 878 | 960 | 795 | 928 | 618 | 848 | 603 |
| pH Efl. | 6.6 | 6.8 | 7.1 | 7.0 | 7.4 | 7.1 | 7.5 | 7.4 | 7.6 | 7.5 |

At the end of each retention time studied, a sample of the zeolite of the digester is taken and its determined that the nitrogen concentration, below in Table 7, the results are shown.

TABLE 7

Concentration of nitrogen at the end of each zeolite TRH studied

| TRH (days) | Nitrogen concentration (%) |
|---|---|
| 1 | 4.4 |
| 2 | 4.9 |
| 3 | 5.8 |
| 4 | 6.4 |
| 5 | 7.6 |

Considering the zeolite is saturated when the concentration of N on it reaches 25% by weight, the saturation of the zeolite for a hydraulic retention time of one day is reached after 56 days of operation. For a hydraulic retention time of 2 days zeolite saturation be achieved at 102 days. For a hydraulic retention time of 3 days the saturation would be reached after 129 days. For a retention time of 4 days the saturation of the zeolite would be reached after 156 days and 164 days would be required finally for 5 days HRT.

Corresponding to the highest efficiencies obtained biogas production was higher in the digester to which the zeolite was added.

The biogas production and the concentration of methane in each digester applied in different hydraulic retention times are shown in Table 8.

TABLE 8

Biogas production in both digesters

| TRH (days) | Digester Control Prod. Biogas (l/d) | Digester Control Methane (%) | Digester with Zeolite Prod. Biogas (l/d) | Methane (%) |
|---|---|---|---|---|
| 1 | 42.5 | 58.3 | 60.4 | 60.2 |
| 2 | 27.3 | 62.1 | 36.5 | 64.1 |
| 3 | 21.7 | 64.4 | 27.5 | 67.3 |
| 4 | 20.8 | 67.3 | 25.1 | 69.5 |
| 5 | 18.9 | 70.0 | 22.8 | 71.0 |

With the results achieved on an experimental scale, an estimate of the operating conditions on a large scale took place:

For wastewater having the following characteristics:
Volume of waste=100 m3/day.
COD=20-30 g/l
Biochemical Oxygen Demand 5 days (BOD5)=10-15 g/l
Alkalinity=3-4 g/l
pH=6.7-7.3
Total solids (TS)=16 to 25 g/l
Total Kjeldahl nitrogen=0.5-1 g/l
Total phosphorus=0.3-0.5 g/l
Alternative A: UASB digester without addition of zeolite-clinoptilolite
Digester volume required: 170 m3
Hydraulic retention time: 1-2 days
Volumetric organic load applied to COD 11-18 Kg/m3/día
COD removal efficiency: 50-60%
Concentration of ammonium nitrogen in the effluent: 450-850 mg/l
Biogas production: 600-700 m3/d
Methane concentration: 55-65%
Amount of inoculum: 25-35 m3
Sludge age: 50-70 days
Alternative B: Digester with addition of zeolite-clinoptilolite
Digester volume required: 120 m3
Hydraulic retention time: 0.7-1.5 days
Volumetric organic load applied to COD: 16-25 Kg DQO/m3/día COD removal efficiency: 65-78%
Concentration of ammonium nitrogen in the effluent: 90-170 mg/l
Biogas production: 700-900 m3/d
Methane concentration: 65-70%
Amount of inoculum: 20-30 m3
Amount of zeolite-clinoptilolite to add: 4-6 m3
Sludge age: 70-90 days Example 2

An experimental study was conducted to compare the effectiveness of the addition of zeolite in the treatment of dairy wastewater. Two UASB digesters were used. A digester was used as a control while the other one was added zeolite clinoptilolite (15% of actual volume).

Both digesters were constructed of acrylic plastic, having an effective volume of 10 liters and a total volume of 12 liters. They had the following dimensions: length and width 15 cm, total height 53 cm; the effective height was 44 cm. The two digesters operated at hydraulic retention times similar 1-5 days. Each retention time was studied for a period of time equivalent to 10 times the corresponding retention time.

Residual characteristics of dairy used in the experiments are presented in Table 9.

TABLE 9

Properties of dairy wastewater used in the experiments

| Parameter | Range | Number of samples |
| --- | --- | --- |
| DQO | 32-46 g/l | 15 |
| ST | 40-56 g/l | 18 |
| SV | 30-38 g/l | 18 |
| Organic N. | 1200-1400 mg/l | 18 |
| N. Ammonia | 2000-3000 mg/l | 18 |
| Phosphorus | 540-780 | 18 |
| Alkalinity (mg./l) | 7800-11400 | 20 |
| AGV (mg./l) | 3540-4740 | 15 |
| pH | 6.9-7.9 | 20 |

UASB digesters were inoculated with 4 liters of well-digested sludge and to the digester adding zeolite, 1.5 kg of zeolite-clinoptilolite was added, particle size between 0.5-2 mm.

During the experiment the following parameters were measured: COD; SST; organic and ammonia nitrogen, phosphorus (orthophosphate), alkalinity, volatile fatty acids, pH; gas production and methane concentration. Table 10 shows the results obtained at different hydraulic retention times studied.

TABLE 10

| Parameter | TRH (days) 1 Control | Zeolite | 2 Control | Zeolite | 3 Control | Zeolite | 4 Control | Zeolite | 5 Control | Zeolite |
| --- | --- | --- | --- | --- | --- | --- | --- | --- | --- | --- |
| E (% DQO) | 34 | 51 | 40 | 59 | 45 | 72 | 55 | 76 | 60 | 79 |
| E (% ST) | 9 | 15 | 23 | 31 | 35 | 49 | 48 | 56 | 60 | 69 |
| E (% SV) | 18 | 24 | 37 | 42 | 46 | 55 | 57 | 66 | 63 | 79 |
| E (% N org) | 20 | 30 | 33 | 44 | 42 | 59 | 53 | 67 | 61 | 76 |
| N. amon. Efl. | 2760 | 1416 | 2841 | 1259 | 3050 | 1241 | 3090 | 1146 | 3230 | 735 |
| PhosphorusEfl. | 460 | 403 | 402 | 375 | 372 | 315 | 357 | 267 | 336 | 257 |
| Alc. Efl. | 5558 | 6026 | 5580 | 6225 | 5950 | 6360 | 6115 | 6450 | 6220 | 6580 |
| AGV Efl. | 1620 | 1207 | 1360 | 1142 | 1250 | 1040 | 1210 | 815 | 1105 | 780 |
| pH Efl. | 7.3 | 7.2 | 7.5 | 7.4 | 7.8 | 7.6 | 7.9 | 7.6 | 8.1 | 7.7 |

At the end of each retention time studied, a sample of the zeolite of the digester is taken and the nitrogen concentration its determined. Below in Table 11, the results are shown.

TABLE 11

Nitrogen concentration in the zeolite

| TRH (days) | Nitrogen concentration (%) |
| --- | --- |
| 1 | 9.8 |
| 2 | 12.1 |
| 3 | 13.5 |
| 4 | 14.9 |
| 5 | 18.3 |

Considering the zeolite is saturated when the concentration of N to 25% by weight of zeolite, the zeolite saturation for a hydraulic retention time of one day be reached after 25 days of operation. For a hydraulic retention time of 2 days zeolite saturation will be achieved after 41 days. For a hydraulic retention time of 3 days it would be eached saturation after 55 days. For a retention time of 4 days the saturation of the zeolite would be reached after 66 days and finally 68 days would be required for a 5 day HRT.

The biogas production was higher in the digester to which the zeolite was added in correspondence with the highest efficiencies obtained in this digester.

The biogas production and the concentration of methane in each digester applied different hydraulic retention times are shown in Table 12.

TABLE 12

Biogas production in both digesters

| TRH (days) | Digester Control Prod. Biogas (l/d) | Digester with Zeolite Methane (%) | Prod. Biogas (l/d) | Methane (%) |
|---|---|---|---|---|
| 1 | 64.6 | 51.3 | 80.4 | 58.4 |
| 2 | 31.4 | 58.1 | 52.3 | 62.7 |
| 3 | 23.4 | 61.4 | 41.7 | 64.3 |
| 4 | 21.5 | 64.3 | 35.0 | 66.5 |
| 5 | 19.5 | 70.0 | 29.6 | 70.0 |

As seen in Table 12, the biogas production was higher in the digester, with the addition of zeolite in the control. The results allowed the calculations for such greater scale and as described below.

Adding zeolite-clinoptilolite to UASB digester operating with wastewater from a dairy.
For wastewater having the following characteristics:
Volume of waste=100 m3/day.
COD=32-46 g/l
pH=7.3-7.6
ST=40-56 g/l
SV=30-38 g/l
Total nitrogen=3.2 to 4.4 g/l
Ammonia nitrogen=2.0-2.5 g/l
Total phosphorus=0.5-0.8 g/l
Alternative A: UASB digester without addition of zeolite-clinoptilolite
Required digester volume: 300 m3
Hydraulic retention time: 3-4 days
Volumetric organic load applied to COD: 9-12 Kg/m3/day
COD removal efficiency: 45-55%
Concentration of ammonium nitrogen in the effluent: 3.0-3.1 mg/l
Biogas production: 700-800 m3/d
Methane concentration: 61-64%
Amount of inoculum: 45-65 m3
Sludge age: 50-70 days
Alternative B: Digester with addition of zeolite-clinoptilolite
Digester volume required: 210 m3
Hydraulic retention time: 2-3 days
Volumetric organic load applied to COD: 13-19 Kg DQO/m3/día
COD removal efficiency: 72-76%
Concentration of ammonium nitrogen in the effluent: 0.4-6 g/l
Biogas production: 950-1100 m3/d
Methane concentration: 65-70%
Amount of inoculum: 35-52 m3
Amount of zeolite-clinoptilolite to add: 10 to 15 m3
Sludge age: 70-90 days
Adding zeolite-clinoptilolite to UASB digester operating with wastewater from a dairy.
For wastewater having the following characteristics:
Volume of waste=100 m3/day.
COD=38-46 g/l
pH=7.3-7.6
ST=31-43 g/l
Volatile solids (VS)=22-32 g/l
Total Kjeldahl nitrogen=2.2-2.6 g/l
Ammonia nitrogen=1.0-1.2 g/l
Total phosphorus=0.3-0.5 g/l
Alternative A: UASB digester without addition of zeolite-clinoptilolite
Required digester volume: 300 m3
Hydraulic retention time: 3-4 days
Volumetric organic load applied to COD: 12-16 Kg/m3/día
COD removal efficiency: 45-55%
Concentration of ammonium nitrogen in the effluent: 2.0-2.5 mg/l
Biogas production: 1000-1200 m3/d
Methane concentration: 50-55%
Amount of inoculum: 45-65 m3
Sludge age: 50-70 days
Alternative B: Digester with addition of zeolite-clinoptilolite
Digester volume required: 210 m3
Hydraulic retention time: 2-3 days
Volumetric organic load applied to COD: 18-22 Kg DQO/m3/día
COD removal efficiency: 59-72%
Concentration of ammonium nitrogen in the effluent: 0.4 to 0.6 g/l
Biogas production: 1300-1700 m3/d
Methane concentration: 65-70%
Amount of inoculum: 35-52 m3
Amount of zeolite-clinoptilolite to add: 10 to 15 m3
Sludge age: 70-90 days

The invention claimed is:

1. A process for anaerobic digestion of wastewater with a concentration of ammonia nitrogen, organic nitrogen, or proteins, in an upflow anaerobic digester and sludge blanket (UASB), with immobilization of microorganisms and inhibition controlled ammonium, the process comprising steps of:
    a) inoculating digested sludge wastewater with a concentration of nitrogen or of proteins that are contained in the digester;
    b) adding to residual inoculated wastewater from step a), zeolite-clinoptilolite having an average particle size of 0.5-2 mm, in a percentage of 15 to 23% volume of zeolite based on the total volume of sludge;
    c) adding to granular activated sludge resulting from step b), increasing volumes of wastewater with a concentration of nitrogen or protein to reach predetermined operating conditions;
    d) monitoring the operation of the digester under predetermined operating conditions of step c), and quantify the removal of organic matter and ammonia nitrogen in an effluent of the digester, the concentration of nitrogen in the digester, biogas production in the digester and a methane concentration in the biogas;
    e) adding zeolite in an accumulation of granular activated sludge of the digester, to detect at least an increase in concentration of ammonium nitrogen in the effluent of the digester, a decrease in removal efficiency, a decrease in removal efficiency of organic material or a decrease in biogas production, keeping constant the volume of sludge in the digester, in a proportion of 20% based on the total volume of the digester; optionally
    f) removing excess sludge produced from the bottom of the digester, and subjecting the excess sludge to dehydration by using sunlight or an alternative method such that a concentration material is obtained with nutrients with a moisture concentration of 20-30%, which can be used as a biofertilizer or slow release fertilizer nutrients.

2. The process of claim 1 wherein the wastewater containing a concentration of ammonia nitrogen, organic nitrogen, or proteins are selected from agricultural wastewater or wastewater of the food industry.

3. The method of claim 1 wherein the wastewater with a concentration of ammonia nitrogen, organic nitrogen, or proteins of livestock origin are selected from wastewater generated in pig farming or wastewater from dairies.

4. The method of claim 1 wherein the concentration of ammonia nitrogen in the wastewater is greater than 1,000 mg/L.

5. The method of claim 2 wherein the concentration of ammonia nitrogen in the wastewater is greater than 1,000 mg/L.

6. The method of claim 3 wherein the concentration of ammonia nitrogen in the wastewater is greater than 1,000 mg/L.

\* \* \* \* \*